(12) United States Patent
Hoffmann et al.

(10) Patent No.: US 10,174,907 B2
(45) Date of Patent: Jan. 8, 2019

(54) LIGHTING DEVICE FOR A CODE READER

(71) Applicant: VITRONIC Dr.-Ing. Stein Bildverarbeitungssysteme GmbH, Wiesbaden (DE)

(72) Inventors: Burghard Hoffmann, Taunusstein (DE); Jorg Ramsauer, Ingelheim (DE)

(73) Assignee: VITRONIC Dr.-Ing. Stein Bildverarbeitungssysteme GmbH, Wiesbaden (DE)

(*) Notice: Subject to any disclaimer, the term of this patent is extended or adjusted under 35 U.S.C. 154(b) by 366 days.

(21) Appl. No.: 15/046,567

(22) Filed: Feb. 18, 2016

(65) Prior Publication Data

US 2016/0245478 A1    Aug. 25, 2016

(30) Foreign Application Priority Data

Feb. 19, 2015 (EP) .................................... 15155793

(51) Int. Cl.
*G06K 7/10* (2006.01)
*G06K 7/14* (2006.01)
*F21V 5/00* (2018.01)
(Continued)

(52) U.S. Cl.
CPC .............. *F21V 5/008* (2013.01); *F21V 5/043* (2013.01); *F21V 5/045* (2013.01);
(Continued)

(58) Field of Classification Search
CPC ........... G06K 7/10574; G06K 7/10603; G06K 7/10613; G06K 7/10623; G06K 7/10633;
(Continued)

(56) References Cited

U.S. PATENT DOCUMENTS 5,758,955 A * 6/1998 Belliveau ................ F21S 10/00
  362/293
6,011,929 A * 1/2000 Fuke ........................ F21V 5/02
  362/16
(Continued)

FOREIGN PATENT DOCUMENTS

DE       102008019084 A1   10/2009
EP           1742168 A1     1/2007
(Continued)

OTHER PUBLICATIONS

European Search Report, European Application No. EP15155793.1.

*Primary Examiner* — Thien T Mai
(74) *Attorney, Agent, or Firm* — Dinsmore & Shohl LLP

(57) ABSTRACT

A lighting device 5 having: a plurality of light sources 7 arranged in a line; each of said light sources 7 having a condenser lens 8 arranged in the optical path 11 of the respective light source 7, wherein said condenser lenses 8 are designed such that light is focused at least in a first plane XZ; at least one cylinder lens 9 in form of a Fresnel lens, arranged in the direction of the optical path behind the condenser lenses 8 wherein said cylinder lens 9 is designed such that light is focused in a second plane YZ, which second plane YZ is arranged traverse to the first plane XZ; and an optical diffuser 10 arranged in the direction of the optical path behind the cylinder lens 9, wherein the optical diffuser 10 is designed such that light is diverged and homogenized in the first plane XZ.

9 Claims, 2 Drawing Sheets

(51) Int. Cl.
*F21V 5/04* (2006.01)
*G02B 27/09* (2006.01)
*F21Y 101/02* (2006.01)

(52) U.S. Cl.
CPC ...... *G02B 27/0911* (2013.01); *G02B 27/0961* (2013.01); *G02B 27/0966* (2013.01); *F21Y 2101/02* (2013.01)

(58) Field of Classification Search
CPC .. G06K 7/10; G06K 7/10564; G06K 7/10584; G06K 7/10594; G06K 7/10663; G06K 7/10673; G06K 7/10693; G06K 7/10702; B82Y 15/00; G02B 27/48; G02B 27/0927; G02B 19/0061; G02B 2027/0118; G02B 27/0101; G02B 27/0911; G02B 27/0966; F21Y 2101/02; F21V 5/04; F21V 5/02; F21V 5/007; F21V 5/002; F21V 5/045; F21V 5/08; F21V 5/00; F21V 5/008
See application file for complete search history.

(56) References Cited

U.S. PATENT DOCUMENTS

| | | | |
|---|---|---|---|
| 6,830,189 B2* | 12/2004 | Tsikos | G06K 7/10 235/462.01 |
| 2002/0050519 A1* | 5/2002 | Oliva | G06K 7/10574 235/454 |
| 2003/0231511 A1 | 12/2003 | Thibault | |
| 2009/0153974 A1* | 6/2009 | Sales | G02B 3/0043 359/621 |
| 2010/0177526 A1* | 7/2010 | Futami | B60Q 1/0041 362/519 |
| 2012/0057345 A1 | 3/2012 | Kuchibhotla | |
| 2013/0126617 A1 | 5/2013 | Olmstead | |

FOREIGN PATENT DOCUMENTS

| | | |
|---|---|---|
| WO | 2005085934 A1 | 9/2005 |
| WO | 2005103795 A1 | 11/2005 |

* cited by examiner

LIGHTING DEVICE FOR A CODE READER

CROSS-REFERENCE TO RELATED APPLICATIONS

This application claims priority to European Patent Application No. 15155793.1 filed Feb. 19, 2015.

FIELD OF THE INVENTION

The invention relates to a lighting device, having a plurality light sources arranged in a line, wherein per each of said light sources a condenser lens is arranged in the optical path. The condenser lenses are formed such that light is focused in a first plane. Furthermore, the lighting device has at least one cylinder lens arranged in the direction of the optical path behind the condenser lenses and which is formed such that light is focused in a second plane. Said second plane is arranged at an angle to the first plane.

BACKGROUND OF THE INVENTION

A lighting device is known from EP 1 742 168 A1. Such lighting devices are part of optoelectronic sensors, as they are for example used in the logistics for detecting codes, like for example bar codes or QR-codes on packages. Application fields of such code readers with lighting devices include package sorting and package tracking for parcel and currier services, identification systems in automatic storages, in a luggage sorting system at airports, product loading and unloading systems and in the quality inspection of objects.

Such optoelectronic code readers have cameras, preferably line scan cameras. Packages on conveyor belts pass said cameras. A lighting device is required, which has a line-like illumination in direction of the detection area of the line scan camera. In this case, a homogeneous brightness distribution is especially advantageous within the illuminated line or line of light to ensure the exact detection of the code for the line scan camera.

EP 1 742 168 A1 is concerned with the problem of common arrangements, which have LEDs for the illumination of the detection area. These arrangements do not have additional beam forming (optical) elements and thus, have especially at large distances between the light sources and the area of the illumination a low efficiency or low brightness and furthermore, do not ensure a uniform illumination.

To solve this problem, according to EP 1 742 168 A1 beam forming optical condenser lenses are provided, which are formed the same in the whole arrangement and have a planar face, facing the light source, and on the opposite side have a spherical, aspherical or toric surface. With increasing distance to the receiver optics the LEDs have a different off-axial alignment to the optical axis of the respective condenser lens. By means of this special arrangement of the off-axial alignment of the LEDs to the optical axis of the respective condenser lenses, the main beam direction of the light, radiated from the LEDs, can be influenced such, that a very special illumination profile is produced. In this manner, for example, the edge decrease of the receiver lens can be compensated. The condenser lenses and the cylinder lens form together an anamorphic projection lens, which forms the light of each of the LEDs to one line of light. In this case, each LED forms a single line of light, wherein the lines of light of the several LEDs is superimposed in a detection range to a resulting line of light. The type and manner of the superimposition of the individual lines of light is influenced such, that the light distribution can vary in the resulting line of light.

DE 10 2008 019 084 A1 discloses also a lighting device, which illuminates a narrow, elongated area with high intensity. The device has a plurality of LEDs arranged adjacent to each other on a flat carrier along a line. A conversion device is arranged with a distance to the LEDs in direction of an optical path and extends along the line of LEDs. Said conversion device converts light beams radiated from the LEDs by means of a plurality of light deflecting elements into light beams, which angle distribution is mixed up in at least one plane. Especially diffusing, breaking or diffractive elements are used as light deflecting elements. The light deflection of the light beams radiated by the individual LEDs is carried out such, that a direct visibility of the individual LEDs, when viewing with a camera, is prevented. To achieve a narrow illuminated area, a condenser lens is provided in the optical path behind the light deflecting elements, focusing the light on one strip in order to achieve a line of light.

SUMMARY OF THE INVENTION

It is the object of the present invention, to obtain a lighting device, illuminating a narrow line-like or strip-like area in a homogeneous and efficient manner.

The object is met by a lighting device, comprising several light sources arranged in a line, a condenser lens arranged in the optical path of each of the respective light sources, wherein said condenser lenses are designed such that light is focused at least in a first plane. The lighting device further comprises at least one cylinder lens in form of a Fresnel lens, arranged in the direction of the optical path behind the condenser lenses wherein said cylinder lens is designed such that light is focused in a second plane, which second plane is arranged traverse to the first plane; and a optical diffuser arranged in the direction of the optical path behind the cylinder lens, wherein the optical diffuser is designed such that light is diverged and homogenized in the first plane. Preferably the light is not or at least not significantly diverged in the second plane.

This arrangement ensures, that the light beams of each individual light source is initially focused in a first plane by the respective condenser lens. In the first plane the light of the individual light sources is changed such that it is at least less divergent, especially approximately parallel after passing the respective condenser lens. In the further course of the optical path, the light is changed by the at least one cylinder lens in a second plane such, that the light is also less divergent, preferably approximately parallel in the second plane. The second plane is arranged traverse to the first plane, e.g. at a right angle to the first plane. Following the focusing of the light beams of the light sources, a diffusing and diverging of the light beams takes place in the first plane.

This arrangement further ensures, that the light beams enter with the smallest possible diverting angle, preferably at least more or less parallel, the cylinder lens in from of a Fresnel lens. Naturally, Fresnel lenses have with increasing divergence angle of the light a decreasing degree of efficiency, so that, as the light enters with a low divergence angle, the degree of efficiency is as large as possible. To be able to form the lighting device in a compact manner, the light is again diverged in the first plane following the cylinder lens to produce the widest possible line of light, which is wider than the lighting device. The line of light can be formed 5 to 6 times wider than the width of the lighting device.

The optical diffuser can be formed such, that the angle of the expansion is 30 degree up to 90 degree, in an exemplary embodiment it is at approximately 60 degrees.

The divergence angle of the light beams during the focusing in the cylinder lens is preferably smaller than 5 degree.

Preferably, a lens grid is provided as optical diffuser.

The light sources are preferably LEDs, which can radiate the light at least in partial areas of the total optical range, i.e. from UV-rays to IR-radiation. In this case, the light sources, especially LEDs, can be arranged in one or several rows along the line.

The condenser lens are, preferably, plano-convex lenses in form of cylinder lenses. Each of said cylinder lenses might have a planar face facing the light source and a convex face facing away from the light source.

However, the condenser lenses can also be Fresnel lenses or holographic foils.

Preferably, the lighting device has a single cylinder lens, which is arranged in the optical path of all light sources.

In an embodiment of the invention the optical diffuser comprises a cylinder lens array, a Fresnel cylinder lens array or a randomized Fresnel prism.

BRIEF DESCRIPTION OF THE DRAWINGS

A preferred embodiment is described in more detail in the following figures.

DETAILED DESCRIPTION OF THE INVENTION

Figure 1:
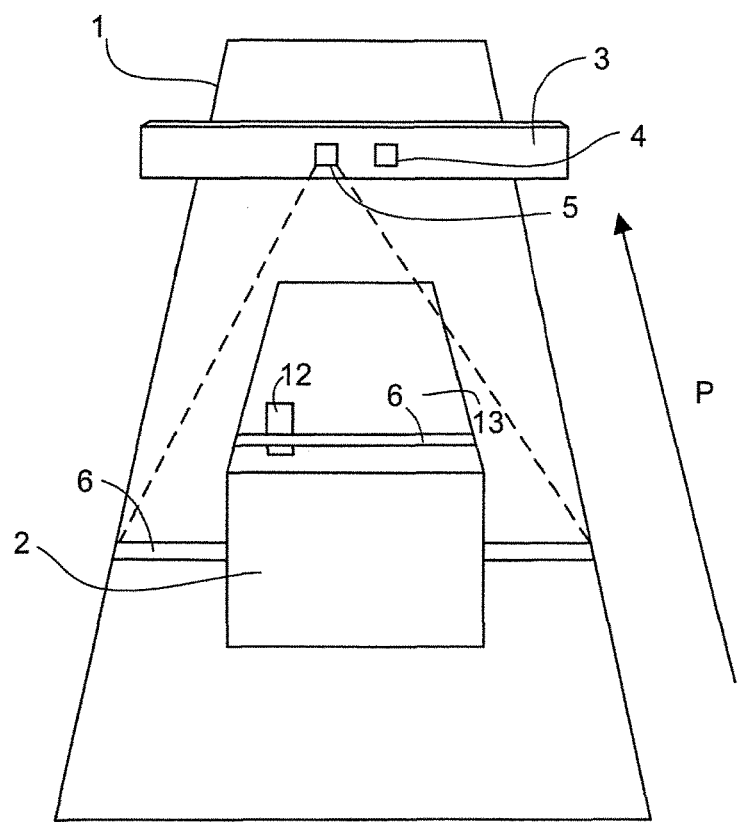
FIG. 1 shows a perspective view of a conveyor belt arrangement for transporting packages with QR- or bar codes and a code reader with a lighting device.

FIG. 1 shows a perspective view of a conveyor device for packages, as it is used for example in sorting packages in logistics plants. The conveyor plant comprises a conveyor belt 1, wherein also alternatively several conveyor belts or driven conveyor rollers, arranged one behind the other, can be provided. The conveyor belt 1 serves for transporting packages 2 in direction of the transportation direction P. Above the conveyor belt 1 a code reader 3 is provided, which extends transversally across the conveyor belt 1. The code reader 3 has a line scan camera 4 and a lighting device 5. The lighting device 5 projects a line of light 6 in direction onto the conveyor belt, wherein the line of light 6 is arranged transversally to the transportation direction P and covers the total width of the conveyor belt 1. Thus, it is ensured, that each package 2, which is arranged on the conveyor belt 1, passes the line of light 6. In this case, the lighting device 5 radiates light preferably vertically downwards onto the conveyor belt 1.

The line scan camera 4 has a viewing area, which corresponds to the line of light 6, so that the detection area of the line scan camera 4 is illuminated by the line of light 6. Then a code 12, which is arranged on the face 13 of the package 2, facing the line scan camera 4, can be detected by the line scan camera 4, to detect it in an evaluation unit. To ensure a very secure and exact detection of codes, like for example QR-codes or bar codes, these have to be reproduced by the line scan camera 4 in the best possible quality. It is important that there is a very homogeneous illumination across the total length of the line of light 6.

Figure 2:
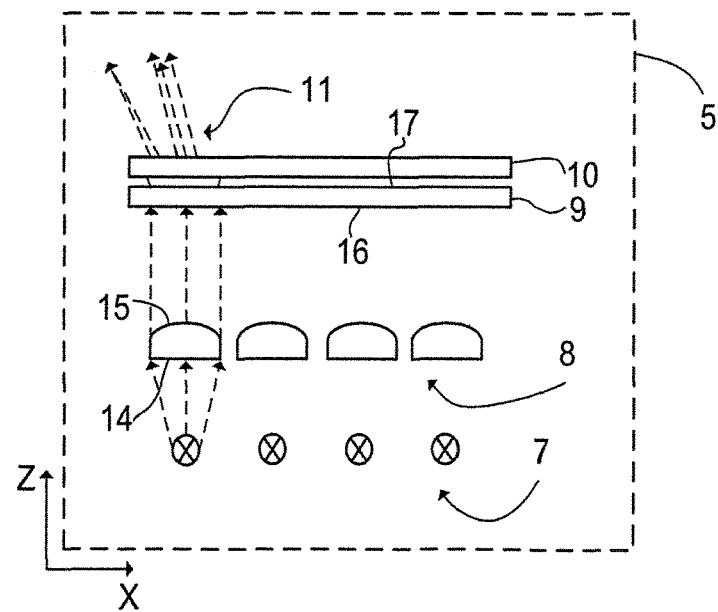
FIG. 2 shows a schematical view of the lighting device of FIG. 1 in a first plane XZ.
Figure 3:
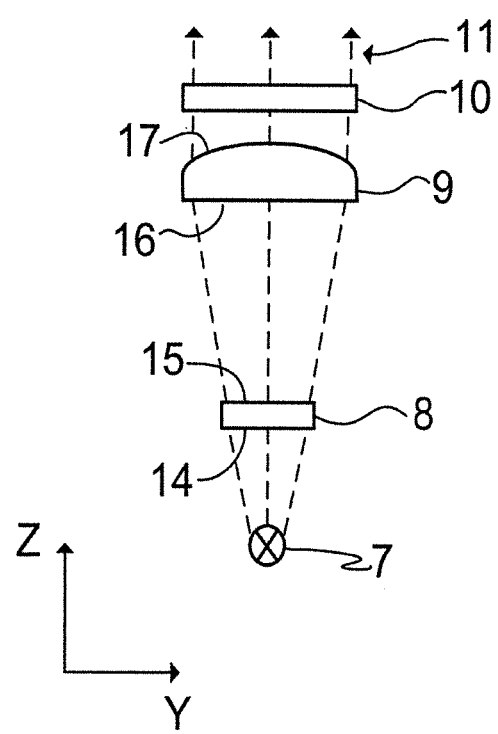
FIG. 3 shows a schematical view of the lighting device of FIG. 2 in a further view in a second plane YZ.

FIGS. 2 and 3 show schematically the structure of the lighting device 5 in two different views, namely in a first plane XZ (FIG. 2) as well as in a second plane YZ (FIG. 3), the latter being arranged in a right angle to the first plane.

The lighting device 5 comprises several light sources 7 arranged in a line next to each other. The light sources 7 can also be arranged in several rows along a line. The light sources 7 can especially comprise LEDs. In an embodiment 24, individual light source can be provided in the form of LEDs, wherein each light source comprises exactly one LED.

To each light source 7, a condenser lens 8 is assigned, which is arranged in the optical path 11 of the respective light source 7. The optical path 11 of one of the light sources 7 is shown in FIG. 2 and in FIG. 3. The light of the light sources 7, divergently propagating, is focused by the condenser lenses 8 such, that an optical path, which is at least more or less parallel and convergent, results behind the condenser lenses 8. The condenser lenses 8 can be cylinder lenses or Fresnel lenses. Cylinder lenses are shown in the figures. These are formed such, that they focus the light along the optical path 11 in a first plane XZ and do not (or just in a very limited way) influence the light in the second plane YZ. For this, the condenser lenses 8 have respectively a planar face 14 assigned to one of the light sources, and a convex face 15 facing away from the respective light source 7. The convex face 15 is formed like a cylinder portion, wherein it has in the first plane XZ an arched cross-section and is in the second plane YZ not arched in cross-section.

The light along optical path between the condenser lenses 8 and the cylinder lens 9 is, in the first plane XZ, at least more or less parallel, however not in the second plane YZ of FIG. 3. The light is thus focused by the cylinder lens 9 in the second plane YZ, wherein the cylinder lens 9 has an optically influencing shape, which is turned by 90° to the condenser lens 8. For this the cylinder lens 9 has, in any case one planar face 16, which is facing the light sources 7, and has one convex face 17, which is facing away from the light sources 7. The convex face 17 is not arched in the first plane XZ in cross-section. The convex face 17 is arched in the second plane YZ in cross-section, so that the light is only influenced in the second plane YZ, to produce light, which extends at least approximately parallel concerning the first plane XZ as well as concerning the second plane YZ, in the direction of the optical path behind the cylinder lens 9.

A optical diffuser 10 is arranged in the direction of the optical path behind the cylinder lens 9, which is formed such, that the optical diffuser 10 diverges the light beams in the first plane XZ. However, the light is not (or just to a very limited extend) diverged in the second plane YZ. Thus, it is ensured, that the produced line of light has a narrow width, has however in its length within the first plane XZ a homogeneous illumination and is fanned out wider than width of the lighting device. The optical diffuser can especially be a cylinder lens array, a Fresnel cylinder lens array or a randomized Fresnel prism.

The invention claimed is:
1. A lighting device comprising:
a plurality of light sources arranged in a line;
a condenser lens arranged in the optical path of each respective light source, wherein said condenser lens is designed such that light is focused at least in a first plane;

at least one cylinder lens in form of a Fresnel lens, arranged in the direction of the optical path behind the condenser lenses wherein said cylinder lens is designed such that light is focused in a second plane, which second plane is arranged traverse to the first plane; and an optical diffuser arranged in the direction of the optical path behind the cylinder lens, wherein the optical diffuser is designed such that light is diverged and homogenized in the first plane.

2. The lighting device according to claim 1, wherein the condenser lenses are formed such, that the light of each of the light sources is focused at least approximately parallel behind the condenser lenses in the first plane.

3. The lighting device according to claim 1, wherein the cylinder lens is formed such, that each of the light of the light sources is focused to be substantially parallel in the optical path behind the cylinder lens in the second plane.

4. The lighting device according to claim 1, wherein an optical diffuser has a lens grid.

5. The lighting device according to claim 1, wherein each of the light sources comprises at least one LED.

6. The lighting device according to claim 1, wherein the condenser lenses are formed as plano-convex lenses.

7. The lighting device according to claim 6, characterized in that each of the condenser lenses has a planar face facing the respective light source and a convex face facing away from the light source.

8. The lighting device according to claim 1, wherein the lighting device has a single cylinder lens arranged in the optical path of said light sources.

9. The lighting device according to claim 1, wherein the optical diffuser comprises a cylinder lens array, a Fresnel cylinder lens array or a randomized Fresnel prism.

* * * * *